US012634782B2

(12) United States Patent (10) Patent No.: US 12,634,782 B2
Hong (45) Date of Patent: May 19, 2026

(54) CELL RESELECTION METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 324 days.

(21) Appl. No.: 18/281,550

(22) PCT Filed: Mar. 11, 2021

(86) PCT No.: PCT/CN2021/080157
§ 371 (c)(1),
(2) Date: Sep. 11, 2023

(87) PCT Pub. No.: WO2022/188088
PCT Pub. Date: Sep. 15, 2022

(65) Prior Publication Data
US 2024/0163754 A1 May 16, 2024

(51) Int. Cl.
*H04W 4/00* (2018.01)
*H04W 36/08* (2009.01)
*H04W 36/32* (2009.01)
*H04W 84/06* (2009.01)

(52) U.S. Cl.
CPC ......... *H04W 36/08* (2013.01); *H04W 36/322* (2023.05); *H04W 36/326* (2023.05); *H04W 84/06* (2013.01)

(58) Field of Classification Search
CPC . H04W 36/08; H04W 36/322; H04W 36/326; H04W 84/06; H04W 48/18
USPC .......................................... 370/331
See application file for complete search history.

(56) References Cited

U.S. PATENT DOCUMENTS

| | | | | |
|---|---|---|---|---|
| 5,574,968 A | 11/1996 | Olds et al. | | |
| 8,892,103 B2 * | 11/2014 | Axmon | ............... | H04W 36/322 |
| | | | | 455/440 |
| 11,990,981 B2 * | 5/2024 | Fan | ........................ | H04W 48/16 |
| 11,997,593 B2 * | 5/2024 | Liberg | .................. | G01S 19/254 |

(Continued)

FOREIGN PATENT DOCUMENTS

| | | |
|---|---|---|
| CN | 111010708 A | 4/2020 |
| CN | 111294733 A | 6/2020 |

(Continued)

OTHER PUBLICATIONS

The State Intellectual Property Office of People's Republic of China, "The First Office Action" issued in Application No. 202180000731.4 dated Sep. 5, 2024, with English translation, (16p).

(Continued)

*Primary Examiner* — Amancio Gonzalez
(74) *Attorney, Agent, or Firm* — Arch & Lake LLP; Hao Tan; Shen Wang

(57) ABSTRACT

Embodiments of the present application provide a cell reselection method. The method is performed by a terminal, and the method includes: determining, on the basis of the positional relationship between the terminal and a source cell, whether to perform a cell reselection operation, where the cell is a cell covered by satellite signals.

18 Claims, 7 Drawing Sheets

(56) References Cited

U.S. PATENT DOCUMENTS

| | | | |
|---|---|---|---|
| 12,035,189 B2* | 7/2024 | Määttänen | H04W 36/00837 |
| 12,199,736 B2* | 1/2025 | Lu | H04W 36/302 |
| 2002/0082017 A1 | 6/2002 | Hattori | |
| 2019/0245614 A1* | 8/2019 | Lucky | H04B 7/2041 |
| 2020/0153500 A1 | 5/2020 | Kim et al. | |
| 2020/0229060 A1 | 7/2020 | Solondz et al. | |
| 2022/0038964 A1* | 2/2022 | Wang | H04W 36/322 |
| 2022/0159481 A1* | 5/2022 | Gao | H04W 28/18 |

FOREIGN PATENT DOCUMENTS

| | | | |
|---|---|---|---|
| CN | 111711973 A | 9/2020 |
| CN | 111989872 A | 11/2020 |
| CN | 112153707 A | 12/2020 |
| CN | 112437393 A | 3/2021 |

OTHER PUBLICATIONS

International Search Report of PCT/CN2021/080157 dated May 28, 2021 with English translation, (4p).

* cited by examiner

CELL RESELECTION METHOD AND APPARATUS, COMMUNICATION DEVICE, AND STORAGE MEDIUM

CROSS REFERENCE

The present application is the U.S. National Stage of International Application No. PCT/CN2021/080157, filed on Mar. 11, 2021, and the entire contents thereof are incorporated herein by reference for all purposes.

TECHNICAL FIELD

The present disclosure relates to the technical field of wireless communication but is not limited to the technical field of wireless communication, and in particular relates to a cell reselection method, an apparatus, a communication device and a storage medium.

BACKGROUND

In non-terrestrial network (NTN) scenario, due to the rapid change of the relative position of the satellite to the ground, in some scenarios, the terminal is continuously covered by the signal of the same satellite for only a few minutes to tens of minutes. Therefore, the terminal needs to continuously perform cell reselection.

It should be noted that, information disclosed in the above background portion is provided only for better understanding of the background of the present disclosure, and thus it may contain information that does not form the prior art known by those ordinary skilled in the art.

SUMMARY

The embodiment of the present disclosure discloses a method, an apparatus, a communication device and a storage medium for cell reselection.

According to a first aspect of the embodiments of the present disclosure, there is provided a method for cell reselection, wherein the method is executed by a terminal, and the method includes:

determining, based on a positional relationship between the terminal and a source cell, whether to perform an operation of cell reselection;

where the cell is a cell covered by a satellite signal.

In one embodiment, the determining, based on the positional relationship between the terminal and the source cell, whether to perform the operation of cell reselection, includes:

determining whether to perform operation of cell reselection based on a positional relationship between the terminal and a reference position of the source cell;

where a position of the reference position relative to the source cell remains unchanged.

In one embodiment, the determining whether to perform operation of cell reselection based on the positional relationship between the terminal and the reference position of the source cell, includes:

determining to perform cell reselection in response to a distance between the terminal and the reference position being outside a threshold range;

or, determining not to perform cell reselection in response to the distance between the terminal and the reference position being within the threshold range.

In one embodiment, the method further includes:

determining the threshold range according to a size of a signal coverage area of the satellite.

In one embodiment, the determining to perform cell reselection in response to the distance between the terminal and the reference position being outside the threshold range, includes:

determining to perform cell reselection in response to a first distance between the terminal and the reference position at a first moment being outside the threshold range and the first distance being greater than a second distance;

where the second distance is the distance between the terminal and the reference position at a second moment; and the second moment is earlier than the first moment.

In one embodiment, the method further includes:

receiving ephemeris information sent by a base station; and determining the position of the reference position according to the ephemeris information.

In one embodiment, the reference position is a position determined according to a center position of the source cell; and wherein the center position of the source cell is determined according to the ephemeris information.

In one embodiment, the method further includes:

receiving cell configuration information of a target cell for cell reselection.

In one embodiment, the cell configuration information includes one or more of:

frequency point information of the target cell;

cell identity ID information;

Synchronization Signal/Physical Broadcast Channel ("SS/PBCH") Block Measurement Timing Configuration ("SMTC") information; or subcarrier spacing information.

According to a second aspect of the embodiments of the present disclosure, there is provided an apparatus for cell reselection, which is applied to a terminal, and the apparatus includes a determining module; where the determining module is configured to: determine whether to perform an operation of cell reselection based on a positional relationship between the terminal and a source cell; wherein, the cell is a cell covered by a satellite signal.

According to a third aspect of the embodiments of the present disclosure, there is provided a communication device, and the communication device includes:

a processor; and a memory for storing instructions executable by the processor;

wherein the processor is configured to: when executing the executable instructions, implements the method according to any embodiment of the present disclosure.

According to a fourth aspect of the embodiments of the present disclosure, there is provided a computer storage medium, wherein the computer storage medium stores a computer executable program, and the executable program implements the method according to any embodiment of the present disclosure when being executed by a processor.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

DETAILED DESCRIPTION

Reference will now be made in detail to the exemplary embodiments, examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the embodiments of the present disclosure. Rather, they are merely examples of apparatuses and methods consistent with aspects of the disclosed embodiments as recited in the appended claims.

Terms used in the embodiments of the present disclosure are for the purpose of describing specific embodiments only, and are not intended to limit the embodiments of the present disclosure. As used in the examples of this disclosure and the appended claims, the singular forms "a" and "the" are also intended to include the plural unless the context clearly dictates otherwise. It should also be understood that the term "and/or" as used herein refers to and includes any and all possible combinations of one or more of the associated listed items.

It should be understood that although the embodiments of the present disclosure may use the terms first, second, third, etc. to describe various information, the information should not be limited to these terms. These terms are only used to distinguish information of the same type from one another. For example, without departing from the scope of the embodiments of the present disclosure, first information may also be referred to as second information, and similarly, second information may also be referred to as first information. Depending on the context, the word "if" as used herein may be interpreted as "at" or "when" or "in response to a determination."

For the purpose of brevity and ease of understanding, the term "more" or "less" is used herein when characterizing a magnitude relationship. However, those skilled in the art can understand that the term "more" also covers the meaning of "greater than or equal to," and "less" also covers the meaning of "less than or equal to."

Figure 1:
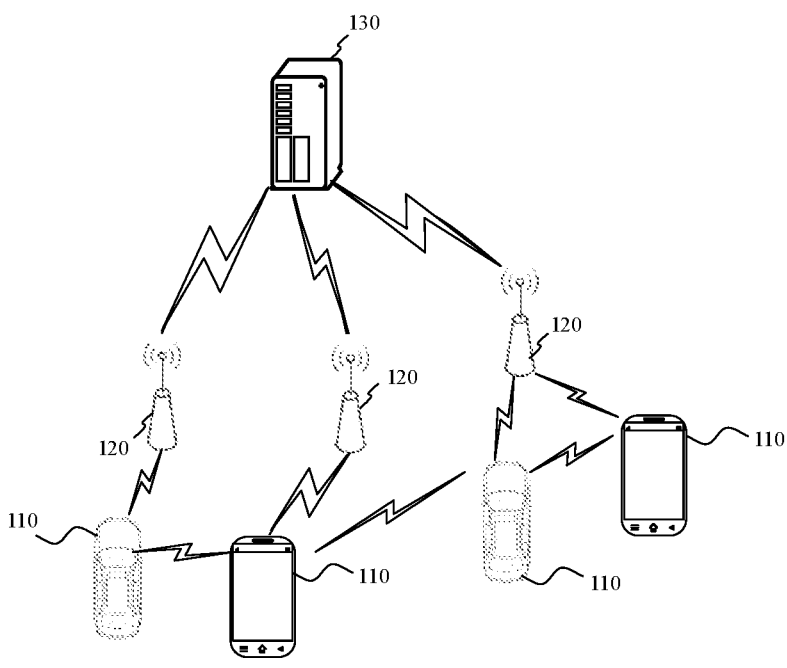
FIG. 1 is a schematic structural diagram of a wireless communication system.

Please refer to FIG. 1, which shows a schematic structural diagram of a wireless communication system provided by an embodiment of the present disclosure. As shown in FIG. 1, the wireless communication system is a communication system based on mobile communication technology, and the wireless communication system may include: several user equipment 110 and several base stations 120.

In the embodiment, the user equipment 110 may be a device that provides voice and/or data connectivity to the user. The user equipment 110 is configured to communicate with one or more core networks via a radio access network (RAN), and the user equipment 110 can be an IoT user equipment, such as a sensor device, a mobile phone, and a computer with an IoT user equipment, for example, may be a fixed, portable, pocket, hand-held, computer built-in, or vehicle-mounted device. For example, station (STA), subscriber unit, subscriber station, mobile station, mobile, remote station, access point, remote terminal, access terminal, user terminal, user agent, user device, or user equipment. Alternatively, the user equipment 110 may also be equipment of an unmanned aerial vehicle. Alternatively, the user equipment 110 may also be a vehicle-mounted device, for example, a trip computer with a wireless communication function, or a wireless user device connected externally to the trip computer. Alternatively, the user equipment 110 may also be a roadside device, for example, may be a street lamp, a signal lamp, or other roadside devices with a wireless communication function.

The base station 120 may be a network side device in a wireless communication system. Wherein, the wireless communication system may be a $4^{th}$ generation mobile communication (4G) system, also known as a long term evolution (LTE) system; or, the wireless communication system may also be a 5G system, also known as new air interface system or 5G NR system. Alternatively, the wireless communication system may also be a next-generation system of the 5G system. In the embodiment, the access network in the 5G system can be referred to as a NG-RAN (New Generation-Radio Access Network).

In the embodiment, the base station 120 may be an evolved base station (eNB) adopted in a 4G system. Alternatively, the base station 120 may also be a base station (gNB) adopting a central and distributed architecture in the 5G system. When the base station 120 adopts a central distributed architecture, it generally includes a central unit (CU) and at least two distributed units (DU). The central unit is provided with a packet data convergence protocol (PDCP) layer, a radio link layer control (RLC) layer, and a media access control (MAC) layer protocol stack; and the distributed unit is provided with a physical (PHY) layer protocol stack, and the embodiment of the present disclosure does not limit the specific implementation manner of the base station 120.

A wireless connection may be established between the base station 120 and the user equipment 110 through a wireless air interface. In different embodiments, the wireless air interface is a wireless air interface based on the fourth-generation mobile communication network technology (4G) standard; or, the wireless air interface is a wireless air interface based on the fifth-generation mobile communication network technology (5G) standard. For example, the wireless air interface is a new air interface; alternatively, the wireless air interface may also be a wireless air interface based on a technical standard of a next-generation mobile communication network based on 5G.

In some embodiments, an E2E (end-to-end) connection may also be established between user equipment 110. For example, the scenario such as a V2V (vehicle to vehicle) communication, a V2I (vehicle to Infrastructure) communication and a V2P (vehicle to pedestrian) communication in the vehicle to everything (V2X) communication.

Here, the above user equipment may be regarded as the terminal device in the following embodiments.

In some embodiments, the foregoing wireless communication system may further include a network management device 130.

Several base stations 120 are connected to the network management device 130 respectively. Wherein, the network management device 130 may be a core network device in a wireless communication system, for example, the network management device 130 may be a mobility management entity (MME). Alternatively, the network management device may also be other core network devices, such as a serving gateway (SGW), a public data network gateway (PGW), a policy and charging rules functional (PCRF) or home subscriber server (HSS), etc. The implementation form of the network management device 130 is not limited in this embodiment of the present disclosure.

In order to facilitate the understanding of those skilled in the art, the embodiments of the present disclosure list a plurality of implementation manners to clearly illustrate the technical solutions of the embodiments of the present disclosure. Of course, those skilled in the art can understand that the multiple embodiments provided by the embodiments of the present disclosure can be executed independently, or combined with the methods of other embodiments in the embodiments of the present disclosure, and can also be executed together with some methods in other related technologies alone or after being combined; this is not limited in the embodiment of the present disclosure.

In order to better understand the technical solution described in any embodiment of the present disclosure, first, the relevant application scenarios of satellite communication are explained.

In wireless communication technology, satellite communication is considered to be an important aspect in the development of future wireless communication technology. Satellite communication refers to the communication carried out by radio communication equipment on the ground using satellites as relays. The satellite communication system consists of a satellite part and a ground part. The characteristics of satellite communication are: large communication range; communication between any two points can be carried out as long as they are within the range covered by the radio waves emitted by the satellite; it is not easily affected by land disasters and has high reliability.

As a supplement to the ground communication system, satellite communication has the following characteristics: 1. Coverage can be extended: for areas where the cellular communication system cannot cover or the coverage cost is high, such as oceans, deserts and remote mountainous areas, satellite communication can be used to solve the problem of communication. 2. Emergency communication: under the condition that the infrastructure of cellular communication is unavailable due to the extreme situation of disaster (such as earthquake, etc.), the use of satellite communication can quickly establish a communication connection. 3. Provide industry applications: for example, for delay-sensitive services of long-distance transmission, satellite communication can be used to reduce the delay of service transmission.

Satellite communication can be the communication between radio communication stations on the ground using communication satellites as relay stations to forward radio waves. The communication function of the communication satellite includes at least one of the following: receiving a signal, changing the frequency of the signal, amplifying the signal, forwarding the signal and positioning.

Figure 2:
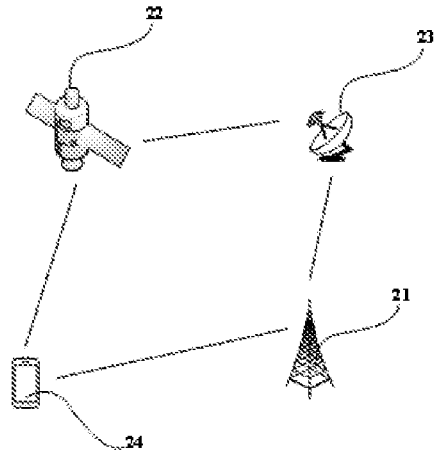
FIG. 2 is a schematic diagram of a satellite communication scenario according to an exemplary embodiment.

In an embodiment, referring to FIG. 2, the wireless communication network may be a network that integrates a mobile communication network and a satellite communication network. In the embodiment, the mobile communication network includes a base station 21, and the satellite communication network includes a communication satellite 22 and a gateway station 23 of the communication satellite.

In one embodiment, the base station 21 can establish a wireless communication connection with the gateway station 23. The terminal 24 can establish a wireless communication connection with the base station 21. The terminal 24 can establish a wireless communication connection with the satellite 22.

Figure 3:
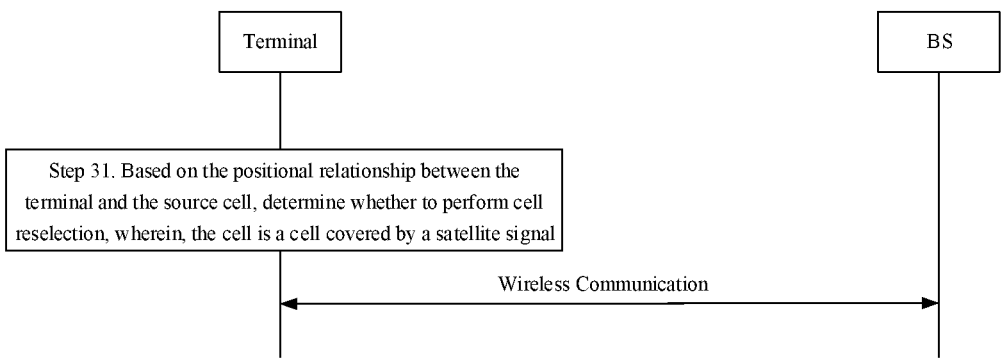
FIG. 3 is a schematic flowchart of a method for cell reselection according to an exemplary embodiment.

As shown in FIG. 3, a method for cell reselection is provided in this embodiment, wherein the method is executed by a terminal, and the method includes the following.

Step 31. Based on the positional relationship between the terminal and the source cell, determine whether to perform cell reselection.

In the embodiment, the cell is a cell covered by a satellite signal.

Here, the terminal may be, but not limited to, a mobile phone, a wearable device, a vehicle terminal, a road side unit (RSU), a smart home terminal, and an industrial sensor device.

Here, the terminal communicates with the base station via satellite.

Here, the base station may be an access device for the terminal to access the network. Here, the base station may be various types of base stations, for example, a base station of a third-generation mobile communication (3G) network, a base station of a fourth-generation mobile communication (4G) network, a base station of a fifth-generation mobile communication (5G) network, or other evolved base station. Here, the satellite may be a low earth orbiting (LEO) satellite. It should be noted that, with the evolution of the satellite wireless communication network, the satellite may also be a medium earth orbiting (MEO) satellite.

In an embodiment, the satellite may be deployed in an airspace where the density of ground base stations is less than the density threshold and the channel quality of the wireless communication environment is less than the quality threshold. For example, airspace where remote mountains and/or oceans are located.

Figure 4:
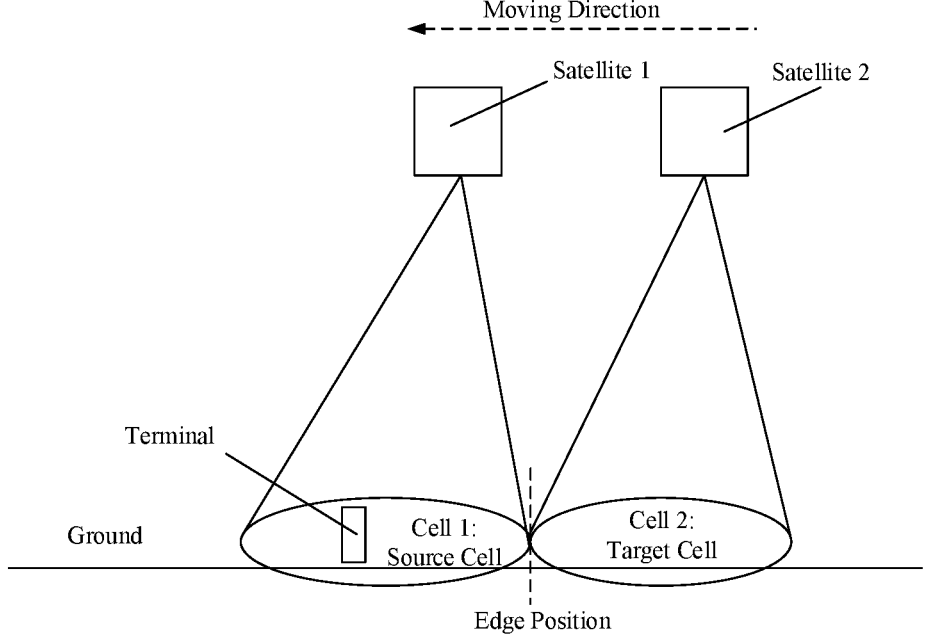
FIG. 4 is a schematic flowchart of a method for cell reselection according to an exemplary embodiment.

In one embodiment, please refer to FIG. 4, the satellite includes satellite 1 and satellite 2; the cell of satellite 1 is cell 1, which is the source cell of the terminal; the cell of satellite 2 is cell 2, and it is assumed that cell 2 is the target cell for the terminal to perform cell re-reselection. The satellite moves relative to the terminal. When the terminal relatively moves to the edge of cell 1, it needs to perform cell reselection, needs to reselect to cell 2, and accesses the cell 2 for camping.

In an embodiment, the cell covered by the satellite signal is an NTN cell, and the source cell to which the terminal is currently connected may be the NTN source cell. In an embodiment, the coverage range of the NTN source cell may be the range of the ground area that the signal of the NTN source cell can cover. Here, one satellite may correspond to at least one NTN cell.

In one embodiment, the satellite may be a flying base station. The base station may be an access device for the terminal to access the NTN.

In one embodiment, the cell of the satellite follows the motion of the satellite. Here, there is a relative speed between the terminal and the NTN source cell.

In some embodiments, the terminal remains stationary relative to the ground and the NTN source cell moves along a fixed trajectory relative to the ground. Alternatively, the terminal moves relative to the ground and the NTN source cell moves along a fixed trajectory relative to the ground. Here, the terminal and the satellite can move in opposite directions or in the same direction.

In one embodiment, each source cell corresponds to a reference position. Here, the reference position can be used to determine the location of the source cell. In an embodiment, the reference position may be determined according to the center position of the source cell. For example, the reference position may be the center location of the source cell.

In one embodiment, based on the location relationship between the terminal and the reference position of the source cell, it is determined whether to perform cell reselection.

Here, the positional relationship between the terminal and the source cell may be a distance relationship and/or an angular relationship between the terminal and the source cell.

In one embodiment, based on the relationship between the coordinate position of the terminal and the coordinate position of the source cell, it is determined whether to perform the operation of cell reselection.

In one embodiment, the terminal is a terminal supporting global navigation satellite system (GNSS) positioning. The terminal periodically obtains the coordinate position of the terminal through GNSS. In this way, the location information of the terminal can be updated in real time.

Here, at different times, the reference position of the source cell is different (since the satellite is moving, the source cell moves with the satellite, therefore, the reference position of the source cell will also move with the satellite) and the position of the reference position relative to the source cell remains unchanged.

In one embodiment, the terminal may determine the reference position according to the received ephemeris information; and determine whether to perform cell reselection based on the positional relationship between the terminal and the reference position of the source cell.

Here, the terminal may receive the ephemeris information sent by the base station in real time. Here, the ephemeris information may be information associated with the satellite's position and/or motion state. At different times, the parameter values of the information contained in the ephemeris information may be different. For example, at different times, the position information of satellites may be different. Here, the location information may be location coordinates. In one embodiment, the ephemeris information includes at least one of the following information: satellite trajectory information, satellite position information, satellite velocity information, and satellite orbit altitude information. Here, the terminal may determine the reference position of the source cell according to the ephemeris information.

In one embodiment, the terminal obtains the ephemeris information through a system message broadcast by the source cell.

In one embodiment, in response to the distance between the terminal and the reference position being outside the threshold range, it is determined to perform cell reselection; or, in response to the distance between the terminal and the reference position being within the threshold range, it is determined not to perform cell reselection.

In one embodiment, the reference position is the center position of the source cell, $P_1$ is the current real-time position coordinates of the terminal, and $P_2$ is the center position coordinates of the source cell calculated by the terminal in real time according to the acquired ephemeris information, then the distance between the center position of the source cell and the terminal is:

$$\Delta D = P_1 - P_2$$

In one embodiment, when the distance between the terminal and the center position of the source cell $\Delta D \geq D_{Thres}$, the terminal performs cell reselection; otherwise, the terminal does not perform cell reselection; wherein, $D_{Thres}$ is the threshold value indicated by the threshold range.

In another embodiment, when the distance between the terminal and the center of the source cell at the first moment $\Delta D_t \geq D_{Thres}$ and the distance between the terminal and the center of the source cell at the second moment $\Delta D_{t-1}$ are smaller than the $\Delta D_t$, the terminal performs cell reselection. Otherwise, it does not perform cell reselection. In the embodiment, $D_{Thres}$ is the threshold indicated by the threshold range; and the second moment is earlier than the first moment. In this way, it can reduce the situation of frequent cell reselection caused by the distance between the terminal and the center of the source cell varying from time to time, and the terminal can reliably perform cell reselection.

In an embodiment, the operation of determining whether to perform cell reselection may be based on the distance and/or angle between the terminal and the reference position of the source cell.

In one embodiment, in response to the relative reference angle and/or distance between the terminal and the reference position being outside a threshold range, it is determined to perform cell reselection; or, in response to the relative reference angle and/or distance between the terminal and the reference position being within the threshold range, it is determined not to perform cell reselection.

In one embodiment, the operation of performing cell reselection is determined according to the average distance between the terminal and the reference position within the first predetermined time period.

In one embodiment, in response to the average value of the distance between the terminal and the reference position within the first predetermined time period being outside the threshold range, it is determined to perform cell reselection. In response to the average value of the distance between the terminal and the reference position within the first predetermined time period being within the threshold range, it is determined not to perform cell reselection. In this way, since the average distance can more accurately reflect the relative positional relationship between the terminal and the reference position, the terminal can reliably perform cell reselection.

In one embodiment, it is determined to perform cell reselection after a second predetermined period of time in response to the distance between the terminal and the reference position being outside a threshold range. Here, since the cell reselection is not performed immediately when the distance between the terminal and the reference position is outside the threshold range, but is determined to be performed after the second predetermined time period, frequent cell reselection caused by repeated changes in the distance between the terminal and the reference position can be reduced, and the terminal can reliably perform cell reselection.

In one embodiment, the second predetermined time period is determined according to the channel quality of the transmission data. In one embodiment, in response to the channel quality of the transmitted data being greater than the channel quality threshold, it is determined that the second predetermined time period is less than the time period threshold; and in response to the channel quality of the transmitted data being less than the quality threshold, it is determined that the second predetermined time period is greater than the time period threshold. In this way, the second predetermined period of time may be adapted to the channel quality of the transmitted data.

In one embodiment, the threshold range is determined according to the signal coverage range of the source cell. In one embodiment, in response to the signal coverage of the source cell being greater than the range threshold, the threshold range is greater than a first value; and in response to the signal coverage of the source cell being smaller than the range threshold, the threshold range is smaller than the first value. In this way, the threshold range can be adaptively adjusted according to the signal coverage range of the source cell. In an embodiment, the signal coverage information may include: the range of the radius, diameter and/or area of the NTN source cell. Here, the signal coverage information may be acquired from the ephemeris information.

In the embodiment of the present disclosure, based on the positional relationship between the terminal and the source cell, it is determined whether to perform a cell reselection operation; wherein, the cell is a cell covered by a satellite signal. Here, since the operation of whether to perform cell reselection is determined based on the positional relationship between the terminal and the source cell, it is only necessary to obtain the positional relationship between the terminal and the source cell to determine whether to perform the operation of cell reselection. If the cell reselection is performed based on the received power of the reference signal, the handover will be more reliable. In this way, the mobility performance of the terminal can be improved.

It should be noted that those skilled in the art can understand that the methods provided in the embodiments of the present disclosure may be executed independently, or together with some methods in the embodiments of the present disclosure or some methods in related technologies.

Figure 5:
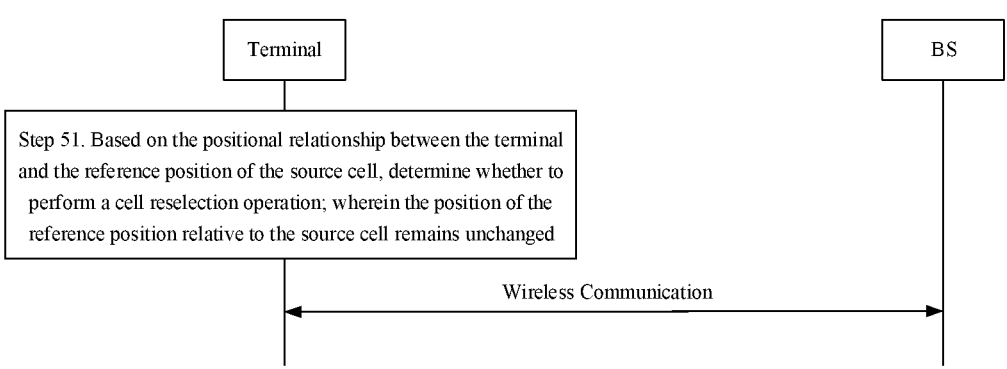
FIG. 5 is a schematic flowchart of a method for cell reselection according to an exemplary embodiment.

As shown in FIG. 5, a method for cell reselection is provided in this embodiment, wherein the method is executed by a terminal, and the method includes the followings.

Step 51. Based on the positional relationship between the terminal and the reference position of the source cell, determine whether to perform a cell reselection operation; wherein the position of the reference position relative to the source cell remains unchanged.

In an embodiment, the operation of determining whether to perform cell reselection may be based on the distance relationship between the terminal and the reference position of the source cell.

In an embodiment, the operation of determining whether to perform cell reselection may be based on the distance and/or angle between the terminal and the reference position of the source cell.

In one embodiment, in response to the distance between the terminal and the reference position being outside the threshold range, it is determined to perform cell reselection; or, in response to the distance between the terminal and the reference position being within the threshold range, it is determined not to perform cell reselection.

In an embodiment, the operation of determining whether to perform cell reselection may be based on a distance relationship and a reference angle relationship between the terminal and the reference position of the source cell.

In one embodiment, in response to the distance between the terminal and the reference position being outside the distance threshold and the reference angle between the terminal and the reference position of the source cell being outside the angle threshold, it is determined to perform cell reselection; or, in response to the distance between the terminal and the reference position is within the distance threshold and the reference angle between the terminal and the reference position of the source cell is within the angle threshold, it is determined not to perform cell reselection.

In one embodiment, in response to within the first time period, the average value of the distance between the terminal and the reference position being outside the distance threshold and the average reference angle between the terminal and the reference position of the source cell being outside the angle threshold, it is determined to perform cell reselection; or, in response to within the first time period, the average distance between the terminal and the reference position being within a distance threshold and the average reference angle between the terminal and the reference position of the source cell being within the angle threshold, determining not to perform cell reselection. In this way, since the average distance and the average angle can more accurately reflect the relative positional relationship between the terminal and the reference position, the terminal can reliably perform cell reselection.

In one embodiment, in response to the distance between the terminal and the reference position being outside the threshold range and the reference angle between the terminal and the reference position of the source cell being outside the angle threshold range, it is determined to perform cell reconfiguration after a second predetermined period of time select. Here, since the distance between the terminal and the reference position is outside the threshold range and the reference angle between the terminal and the reference position of the source cell is outside the angle threshold range, cell reselection is not performed immediately, rather, after the second predetermined time, it is determined to perform cell reselection. It is possible to reduce frequent cell reselection caused by repeated changes in the distance and angle between the terminal and the reference position, and the terminal can reliably perform cell reselection.

In one embodiment, each source cell corresponds to a reference position. Here, the reference position can be used to determine the location of the source cell. In an embodiment, the reference position may be determined according to the center position of the source cell. For example, the reference position may be the center location of the source cell. Here, the signal coverage area of the source cell is a circle, and the center position may be the center of the circle.

In an embodiment, the terminal can determine the reference position according to the received ephemeris information. Here, the terminal may receive the ephemeris information sent by the base station in real time. Here, the ephemeris information may be information associated with the satellite's position and/or motion state.

In an embodiment, at different times, the parameter values of the information included in the ephemeris information may be different. For example, at different times, the position information of the satellite may be different, and the cell position of the satellite may also be different. Here, the location information may be location coordinates. In one embodiment, the ephemeris information includes at least one of the following information: satellite trajectory information, satellite position information, satellite velocity information, and satellite orbit altitude information. Here, since the location of the cell of the satellite is associated with the ephemeris information of the satellite, the terminal can determine the reference position of the source cell according to the ephemeris information. Here, it should be noted that the reference position is a position determined based on a satellite cell as a reference. Therefore, when the satellite cell moves, the position of the reference position relative to the satellite cell will not change, and the reference position will move following the cell of the satellite.

It should be noted that those skilled in the art can understand that the methods provided in the embodiments of the present disclosure may be executed independently, or together with some methods in the embodiments of the present disclosure or some methods in related technologies.

Figure 6:
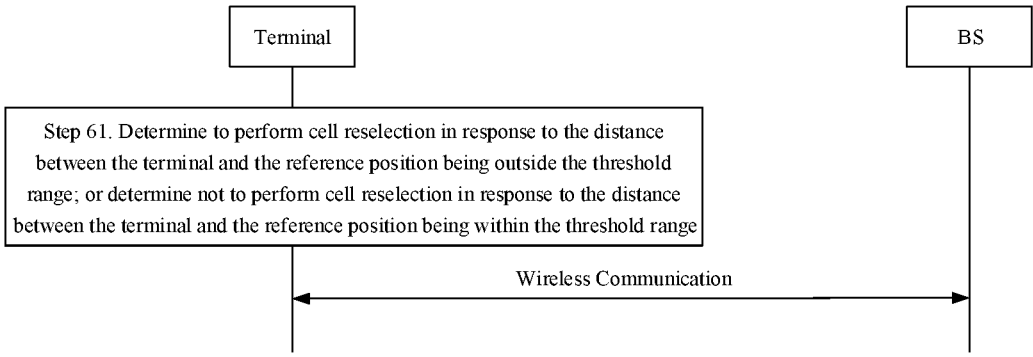
FIG. 6 is a schematic flowchart of a method for cell reselection according to an exemplary embodiment.

FIG. 6, a method for cell reselection is provided in this embodiment, wherein the method is executed by a terminal, and the method includes the following.

Step 61. Determine to perform cell reselection in response to the distance between the terminal and the reference position being outside the threshold range; or determine not to perform cell reselection in response to the distance between the terminal and the reference position being within the threshold range.

In one embodiment, the reference position is the center position of the source cell, $P_1$ is the current real-time position coordinates of the terminal, and $P_2$ is the center position coordinates of the source cell calculated by the terminal in real time according to the acquired ephemeris information, then the distance between the center position of the source cell and the terminal is:

$$\Delta D = P_1 - P_2$$

In one embodiment, when the distance between the terminal and the center position of the source cell $\Delta D \geq D_{Thres}$, the terminal performs cell reselection; otherwise, the terminal does not perform cell reselection; wherein, $D_{Thres}$ is the threshold value indicated by the threshold range.

In another embodiment, when the distance between the terminal and the center of the source cell at the first moment $\Delta D_t \geq D_{Thres}$ and the distance between the terminal and the center of the source cell at the second moment $\Delta D_{t-1}$ are smaller than the $\Delta D_t$, the terminal performs cell reselection. Otherwise, it does not perform cell reselection. In the embodiment, $D_{Thres}$ is the threshold indicated by the threshold range; and the second moment is earlier than the first moment. In this way, it can reduce the situation of frequent cell reselection caused by the distance between the terminal and the center of the source cell varying from time to time, and the terminal can reliably perform cell reselection.

In an embodiment, the operation of determining whether to perform cell reselection may be based on the average value of the distance between the terminal and the reference position of the source cell within a first predetermined time period.

In one embodiment, in response to the average value of the distance between the terminal and the reference position within the first predetermined time period being outside the threshold range, it is determined to perform cell reselection. In response to the average value of the distance between the terminal and the reference position within the first predetermined time period being within the threshold range, it is determined not to perform cell reselection. In this way, since the average distance can more accurately reflect the relative positional relationship between the terminal and the reference position, the terminal can reliably perform cell reselection.

In one embodiment, it is determined to perform cell reselection after a second predetermined period of time in response to the distance between the terminal and the reference position being outside a threshold range. Here, since the cell reselection is not performed immediately when the distance between the terminal and the reference position is outside the threshold range, but is determined to be performed after the second predetermined time period, frequent cell reselection caused by repeated changes in the distance between the terminal and the reference position can be reduced, and the terminal can reliably perform cell reselection.

In one embodiment, the threshold range is determined according to the signal coverage range of the source cell. In one embodiment, in response to the signal coverage of the source cell being greater than the range threshold, the threshold range is greater than a first value; and in response to the signal coverage of the source cell being smaller than the range threshold, the threshold range is smaller than the first value. In this way, the threshold range can be adaptively adjusted according to the signal coverage range of the source cell. In an embodiment, the signal coverage information may include: information of the radius, diameter and/or area of the NTN source cell. Here, the signal coverage information may be acquired from the ephemeris information.

It should be noted that those skilled in the art can understand that the methods provided in the embodiments of the present disclosure may be executed independently, or together with some methods in the embodiments of the present disclosure or some methods in related technologies.

Figure 7:
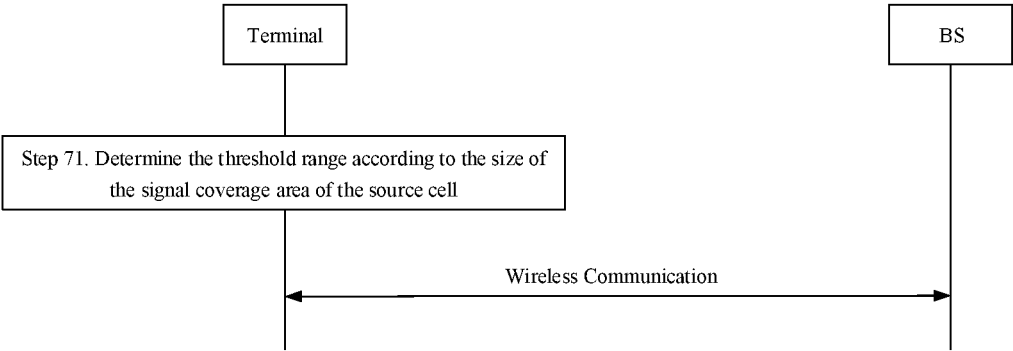
FIG. 7 is a schematic flowchart of a method for cell reselection according to an exemplary embodiment.

As shown in FIG. 7, a method for cell reselection is provided in this embodiment, wherein the method is executed by a terminal, and the method includes the following.

Step 71. Determine the threshold range according to the size of the signal coverage area of the source cell.

In an embodiment, the signal coverage area of the source cell may be a ground area where the signal of the NTN source cell can cover.

In one embodiment, the size of the signal coverage area of the source cell is determined according to the transmit power of the satellite of the source cell.

In one embodiment, in response to the transmit power of the satellite of the source cell being greater than the power threshold, it is determined that the signal coverage area of the source cell is greater than the second value; and in response to the transmit power of the satellite of the source cell being less than the power threshold, it is determined that the signal coverage area of the source cell is smaller than the second value. In this way, the signal coverage area of the source cell can be adaptively adjusted according to the transmit power of the satellite of the source cell.

In one embodiment, the threshold range is determined according to the signal coverage range of the source cell. In one embodiment, in response to the signal coverage of the source cell being greater than the range threshold, the threshold range is greater than a first value; and in response to the signal coverage of the source cell being smaller than the range threshold, the threshold range is smaller than the first value. In this way, the threshold range can be adaptively adjusted according to the signal coverage range of the source cell. In an embodiment, the signal coverage information may include: the range of the radius, diameter and/or area of the source cell. In an embodiment, the signal coverage information may include: the range of the radius, diameter and/or area of the NTN source cell. Here, the signal coverage information may be acquired from the ephemeris information.

It should be noted that those skilled in the art can understand that the methods provided in the embodiments of the present disclosure may be executed independently, or together with some methods in the embodiments of the present disclosure or some methods in related technologies.

Figure 8:
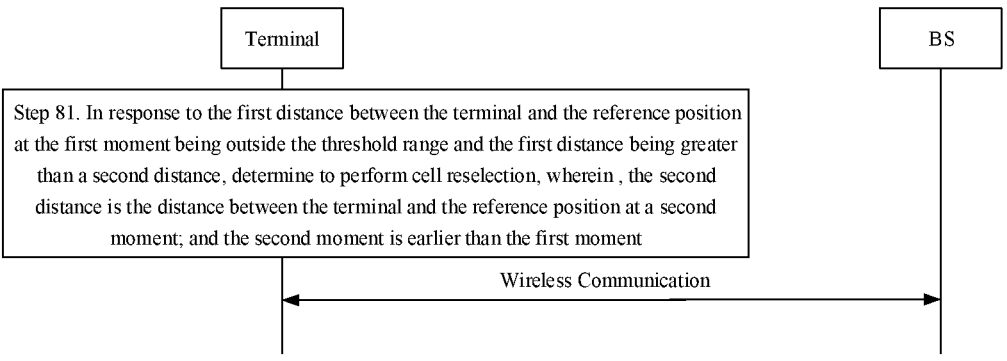
FIG. 8 is a schematic flowchart of a method for cell reselection according to an exemplary embodiment.

As shown in FIG. 8, a method for cell reselection is provided in this embodiment, wherein the method is performed by a terminal, and the method includes the following.

Step 81. In response to the first distance between the terminal and the reference position at the first moment being outside the threshold range and the first distance being greater than a second distance, determine to perform cell reselection.

In the embodiment, the second distance is the distance between the terminal and the reference position at a second moment; and the second moment is earlier than the first moment.

In one embodiment, it is determined that the first distance is greater than the second distance in response to the terminal moving in a direction opposite to the reference position; and in response to the terminal moving in the same direction as the reference position, it is determined that the first distance is smaller than the second distance.

In one embodiment, at the second moment, the distance between the terminal and the reference position is the second distance; at the first moment, the distance between the terminal and the reference position is the first distance; and in response to the first distance being outside the threshold range and the first distance is greater than the second distance, determine to perform cell reselection.

In an embodiment, the first distance is outside the threshold range, which may mean that the first distance is greater than a threshold value indicated by the threshold range. In one embodiment, in response to the first distance being greater than a threshold value indicated by the threshold range and the first distance being greater than the second distance, it is determined to perform cell reselection.

Here, the second moment is before the first moment in the time domain. The first moment may be the current moment. Here, the second moment may be a moment when the terminal detects the positional relationship between the terminal and the reference position before the first moment.

It should be noted that those skilled in the art can understand that the methods provided in the embodiments of the present disclosure may be executed independently, or together with some methods in the embodiments of the present disclosure or some methods in related technologies.

Figure 9:
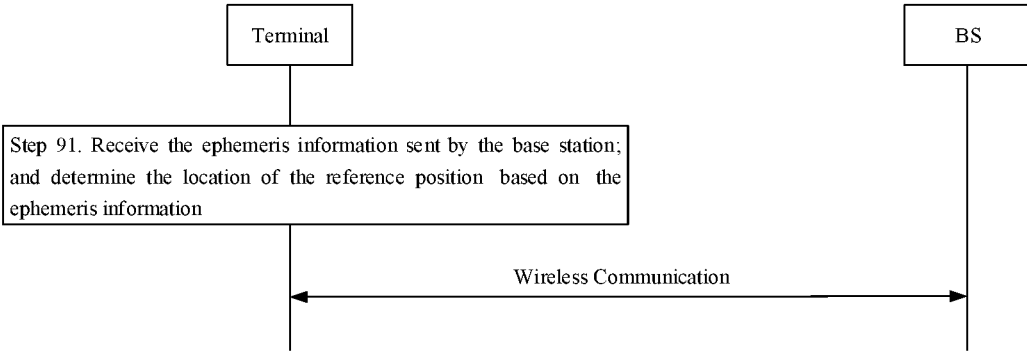
FIG. 9 is a schematic flowchart of a method for cell reselection according to an exemplary embodiment.

As shown in FIG. 9, a method for cell reselection is provided in this embodiment, wherein the method is executed by a terminal, and the method includes the following.

Step 91. Receive the ephemeris information sent by the base station.

Based on the ephemeris information, the location of the reference position is determined.

Here, at different moments, the reference position of the source cell is different (since the satellite is moving, the source cell moves with the satellite, therefore, the reference position of the source cell will also move with the satellite)

and the position of the reference position relative to the source cell remains unchanged.

In an embodiment, the terminal may periodically receive the ephemeris information sent by the base station. Here, the ephemeris information may be information associated with the satellite's position and/or motion state. At different times, the parameter values of the information contained in the ephemeris information may be different. For example, at different times, the position information of satellites may be different. Here, the location information may be location coordinates. In one embodiment, the ephemeris information includes at least one of the following information: satellite trajectory information, satellite position information, satellite velocity information, and satellite orbit altitude information. Here, since the reference position is associated with the ephemeris information, the terminal can determine the reference position of the source cell according to the ephemeris information.

In one embodiment, the reference position is a position determined according to the central position of the source cell; wherein, the central position of the source cell is determined according to ephemeris information.

Figure 10:
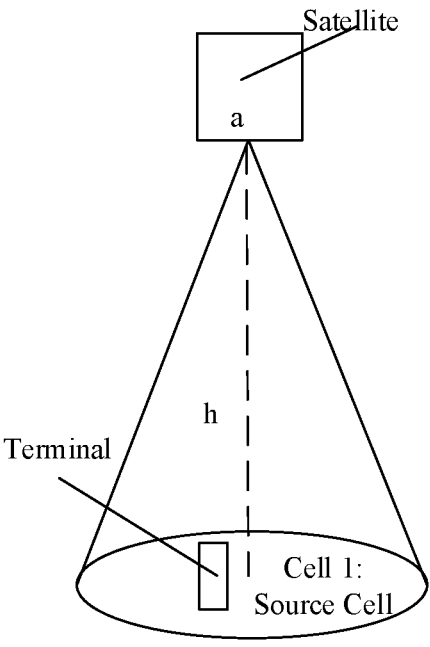
FIG. 10 is a schematic flowchart of a method for cell reselection according to an exemplary embodiment.

For example, please refer to FIG. 10, at time A, the satellite is at position "a" of the orbiting trajectory, and its orbiting altitude is "h", then the reference position can be determined based on the position "a" and the "h". Here, the reference position is the center position of the cell.

It should be noted that: the reference position may also be other locations determined according to the center location of the source cell. For example, a position directly north of the central position at a position "a" away from the central position may be determined as the reference position.

In one embodiment, in response to establishing an RRC connection between the terminal and the base station, the ephemeris information sent by the base station is received.

In one embodiment, an RRC message carrying ephemeris information is received.

In one embodiment, a random access message carrying ephemeris information is received. Here, the random access message may include a second random access message and a fourth random access message.

In this way, the signaling compatibility of the RRC message and the random access message can be improved.

In one embodiment, the terminal obtains the ephemeris information through a system message broadcast by the source cell.

It should be noted that those skilled in the art can understand that the methods provided in the embodiments of the present disclosure may be executed independently, or together with some methods in the embodiments of the present disclosure or some methods in related technologies.

Figure 11:
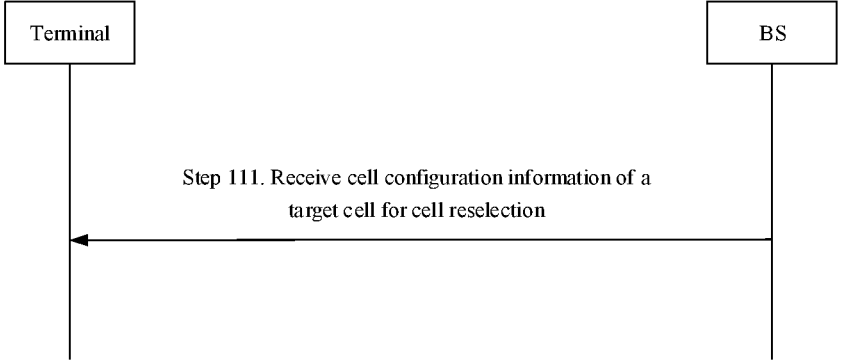
FIG. 11 is a schematic flowchart of a method for cell reselection according to an exemplary embodiment.

As shown in FIG. 11, this embodiment provides a method for cell reselection, wherein the method is executed by a terminal, and the method includes the following.

Step 111. Receive cell configuration information of a target cell for cell reselection.

In one embodiment, the cell configuration information includes one or more of the following.

Frequency point information of the target cell.

Cell ID information.

SS/PBCH block measurement timing configuration SMTC information.

Subcarrier spacing information.

In an embodiment, the terminal receives cell configuration information of a target cell for cell reselection through a system message.

Here, after the terminal receives the cell configuration information of the target cell and reselects to the target cell, it can use the cell configuration information to perform data transmission in the target cell.

It should be noted that those skilled in the art can understand that the methods provided in the embodiments of the present disclosure may be executed independently, or together with some methods in the embodiments of the present disclosure or some methods in related technologies.

Figure 12:
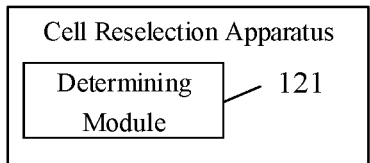
FIG. 12 is a schematic diagram of an apparatus for cell reselection according to an exemplary embodiment.

As shown in FIG. 12, an embodiment of the present disclosure provides an apparatus for cell reselection, which is applied to a terminal, and the apparatus includes a determining module 121.

The determining module 121 is configured to: determine whether to perform a cell reselection operation based on the positional relationship between the terminal and the source cell; wherein, the cell is a cell covered by a satellite signal.

It should be noted that those skilled in the art can understand that the methods provided in the embodiments of the present disclosure may be executed independently, or together with some methods in the embodiments of the present disclosure or some methods in related technologies.

Regarding the apparatus in the foregoing embodiments, the specific manner in which each module executes operations has been described in detail in the embodiments related to the method, and will not be described in detail here.

An embodiment of the present disclosure provides a communication device, which includes:

a processor; and a memory for storing processor-executable instructions;

wherein, the processor is configured to implement the method applied to any embodiment of the present disclosure when executing the executable instructions.

In the embodiment, the processor may include various types of storage media, which are non-transitory computer storage media, and can continue to store information recorded thereon after the communication device is powered off.

The processor can be connected to the memory through a bus or the like, and is used to read the executable program stored in the memory.

An embodiment of the present disclosure further provides a computer storage medium, wherein the computer storage medium stores a computer executable program, and when the executable program is executed by a processor, the method of any embodiment of the present disclosure is implemented.

Regarding the device in the foregoing embodiments, the specific manner in which each module executes operations has been described in detail in the embodiments related to the method, and will not be described in detail here.

Figure 13:
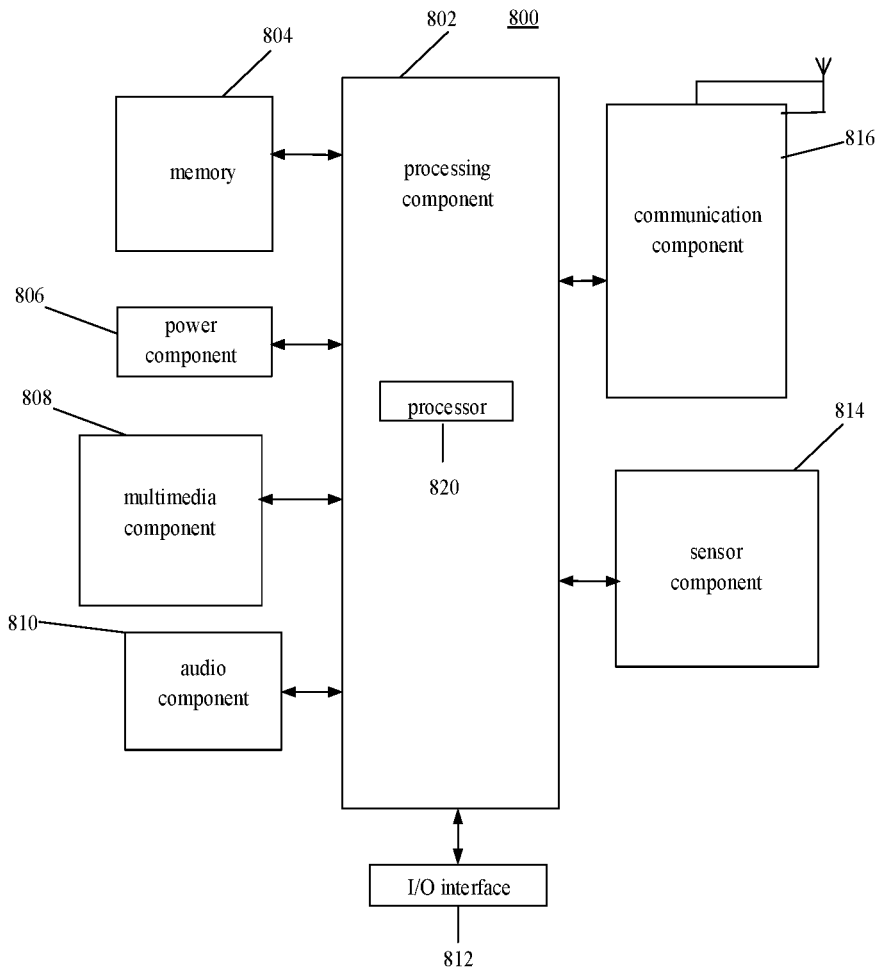
FIG. 13 is a schematic structural diagram of a terminal according to an exemplary embodiment.

As shown in FIG. 13, an embodiment of the present disclosure provides the structure of a terminal.

Referring to FIG. 13, the terminal 800 is shown. The embodiment provides a terminal 800, which specifically can be a mobile phone, a computer, a digital broadcast terminal, a messaging device, a game console, a tablet device, a medical device, a fitness device, a personal digital assistant, and the like.

Referring to FIG. 13, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the terminal 800, such as operations associated with display, telephone calls, data communications, camera operations, and recording operations. The processing component 802 may include one or more processors 820 to execute instructions to complete all or part of the steps of the above method. Additionally, processing component 802 may include one or more modules that facilitate interaction between processing component 802 and other components. For example, processing component 802 may include a multimedia module to facilitate interaction between multimedia component 808 and processing component 802.

The memory 804 is configured to store various types of data to support operations at the device 800. Examples of such data include instructions for any application or method operating on the terminal 800, contact data, phonebook data, messages, pictures, videos, etc. The memory 804 can be realized by any type of volatile or non-volatile storage device or their combination, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 806 provides power to various components of the terminal 800. The power component 806 may include a power management system, one or more power supplies, and other components associated with generating, managing, and distributing power for terminal 800.

The multimedia component 808 includes a screen providing an output interface between the terminal 800 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch or a swipe action, but also detect duration and pressure associated with the touch or swipe operation. In some embodiments, the multimedia component 808 includes a front camera and/or a rear camera. When the device 800 is in an operation mode, such as a photographing mode or a video mode, the front camera and/or the rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC), which is configured to receive an external audio signal when the terminal 800 is in an operation mode, such as a call mode, a recording mode and a voice recognition mode. Received audio signals may be further stored in memory 804 or sent via communication component 816. In some embodiments, the audio component 810 also includes a speaker for outputting audio signals.

The I/O interface 812 provides an interface between the processing component 802 and a peripheral interface module, which may be a keyboard, a click wheel, a button, and the like. These buttons may include, but are not limited to: a home button, volume buttons, start button, and lock button.

The sensor component 814 includes one or more sensors for providing terminal 800 with various aspects of status assessment. For example, the sensor component 814 can detect the open/closed state of the device 800, the relative positioning of components, such as the display and the keypad of the terminal 800, the sensor component 814 can also detect the terminal 800 or a change in the position of a component of the terminal 800, the presence or absence of user's contact with the terminal 800, the change of orientation or acceleration/deceleration of the terminal 800 and the temperature change of the terminal 800. The sensor component 814 may include a proximity sensor configured to detect the presence of nearby objects in the absence of any physical contact. The sensor component 814 may also include an optical sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the terminal 800 and other devices. The terminal 800 can access a wireless network based on communication standards, such as Wi-Fi, 2G or 3G, or a combination thereof. In an exemplary embodiment, the communication component 816 receives broadcast signals or broadcast related information from an external broadcast management system via a broadcast channel. In an exemplary embodiment, the communication component 816 also includes a near field communication (NFC) module to facilitate short-range communication. For example, the NFC module can be implemented based on radio frequency identification (RFID) technology, infrared data association (IrDA) technology, ultra wideband (UWB) technology, bluetooth (BT) technology and other technologies.

In an exemplary embodiment, terminal 800 may be implemented by one or more application specific integrated circuits (ASIC), digital signal processors (DSP), digital signal processing devices (DSPD), programmable logic devices (PLD), field programmable gate array (FPGA), controllers, microcontrollers, microprocessors or other electronic components for performing the method described above.

In an exemplary embodiment, there is also provided a non-transitory computer-readable storage medium including instructions, such as the memory 804 including instructions, which can be executed by the processor 820 of the terminal 800 to implement the above method. For example, the non-transitory computer readable storage medium may be ROM, random access memory (RAM), CD-ROM, magnetic tape, floppy disk, and optical data storage device, and the like.

Figure 14:
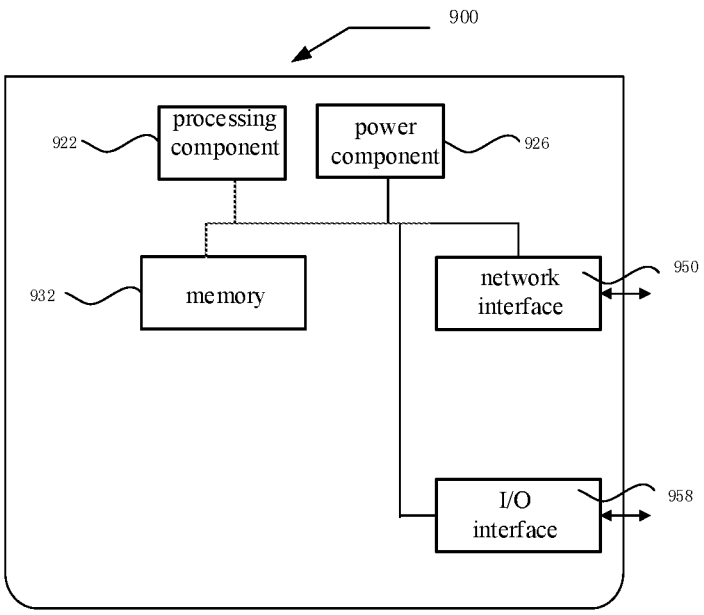
FIG. 14 is a block diagram of a base station according to an exemplary embodiment.

As shown in FIG. 14, an embodiment of the present disclosure shows a structure of a base station. For example, the base station 900 may be provided as a network side device. Referring to FIG. 14, the base station 900 includes a processing component 922, which further includes one or more processors, and a memory resource represented by a memory 932 for storing instructions executable by the processing component 922, such as application programs. The application program stored in memory 932 may include one or more modules each corresponding to a set of instructions. In addition, the processing component 922 is configured to execute instructions, so as to perform any of the aforementioned methods applied to the base station.

Base station 900 may also include a power component 926 configured to perform power management of base station 900, a wired or wireless network interface 950 configured to connect base station 900 to a network, and an input-output (I/O) interface 958. The base station 900 can operate based on an operating system stored in the memory 932, such as Windows Server™, Mac OS X™, Unix™, Linux™, FreeBSD™ or the like.

The embodiment of the present disclosure discloses a method, an apparatus, a communication device and a storage medium for cell reselection.

According to a first aspect of the embodiments of the present disclosure, there is provided a method for cell reselection, wherein the method is executed by a terminal, and the method includes:

determining, based on a positional relationship between the terminal and a source cell, whether to perform an operation of cell reselection;

wherein, the cell is a cell covered by a satellite signal.

In one embodiment, the determining, based on the positional relationship between the terminal and the source cell, whether to perform the operation of cell reselection, includes:

determining whether to perform operation of cell reselection based on a positional relationship between the terminal and a reference position of the source cell;

wherein, a position of the reference position relative to the source cell remains unchanged.

In one embodiment, the determining whether to perform operation of cell reselection based on the positional relationship between the terminal and the reference position of the source cell, includes:

determining to perform cell reselection in response to a distance between the terminal and the reference position being outside a threshold range;

or, determining not to perform cell reselection in response to the distance between the terminal and the reference position being within the threshold range.

In one embodiment, the method further includes:

determining the threshold range according to a size of a signal coverage area of the satellite.

In one embodiment, the determining to perform cell reselection in response to the distance between the terminal and the reference position being outside the threshold range, includes:

determining to perform cell reselection in response to a first distance between the terminal and the reference position at a first moment being outside the threshold range and the first distance being greater than a second distance;

wherein, the second distance is the distance between the terminal and the reference position at a second moment; and the second moment is earlier than the first moment.

In one embodiment, the method further includes:

receiving ephemeris information sent by a base station; and determining the position of the reference position according to the ephemeris information.

In one embodiment, the reference position is a position determined according to a center position of the source cell; and wherein the center position of the source cell is determined according to the ephemeris information.

In one embodiment, the method further includes:

receiving cell configuration information of a target cell for cell reselection.

In one embodiment, the cell configuration information includes one or more of:

frequency point information of the target cell;

cell identity ID information;

SS/PBCH block measurement timing configuration SMTC information; or subcarrier spacing information.

According to a second aspect of the embodiments of the present disclosure, there is provided an apparatus for cell reselection, which is applied to a terminal, and the apparatus includes a determining module; wherein, the determining module is configured to: determine whether to perform an operation of cell reselection based on a positional relationship between the terminal and a source cell; wherein, the cell is a cell covered by a satellite signal.

According to a third aspect of the embodiments of the present disclosure, there is provided a communication device, and the communication device includes:

a processor; and a memory for storing instructions executable by the processor;

wherein the processor is configured to: when executing the executable instructions, implements the method according to any embodiment of the present disclosure.

According to a fourth aspect of the embodiments of the present disclosure, there is provided a computer storage medium, wherein the computer storage medium stores a computer executable program, and the executable program implements the method according to any embodiment of the present disclosure when being executed by a processor.

In the embodiment of the present disclosure, based on the positional relationship between the terminal and the source cell, it is determined whether to perform an operation of cell reselection; wherein, the cell is a cell covered by a satellite signal. Here, since whether to perform the operation of cell reselection is determined based on the positional relationship between the terminal and the source cell, it is only necessary to obtain the positional relationship between the terminal and the source cell to determine whether to perform the operation of cell reselection. Compared with the method in which the terminal needs to perform cell reselection based on the reference signal receiving power (RSRP), the handover will be more reliable, so that the mobility performance of the terminal can be improved.

Other embodiments of the invention will be readily apparent to those skilled in the art from consideration of the specification and practice of the invention disclosed herein. This disclosure is intended to cover any modification, use or adaptation of the present invention, these modifications, uses or adaptations follow the general principles of the present invention and include common knowledge or conventional technical means in the technical field not disclosed in this disclosure. The specification and examples are to be considered exemplary only, with a true scope and spirit of the invention being indicated by the following claims.

It should be understood that the present invention is not limited to the precise constructions which have been described above and shown in the accompanying drawings, and various modifications and changes may be made without departing from the scope thereof. The scope of the invention is limited only by the appended claims.

What is claimed is:

1. A method for cell reselection, wherein the method is executed by a terminal, and the method comprises:

determining, based on a positional relationship between the terminal and a source cell, whether to perform cell reselection;

wherein, the source cell is a cell covered by a satellite signal, wherein determining, based on the positional relationship between the terminal and the source cell, whether to perform cell reselection, comprises:

determining whether to perform cell reselection based on a positional relationship between the terminal and a reference position of the source cell;

wherein a position of the reference position relative to the source cell remains unchanged.

2. The method according to claim 1, wherein determining whether to perform cell reselection based on the positional relationship between the terminal and the reference position of the source cell, comprises:

determining to perform cell reselection in response to determining that a distance between the terminal and the reference position of the source cell is outside a threshold range;

or, determining not to perform cell reselection in response to determining that the distance between the terminal and the reference position of the source cell is within the threshold range.

3. The method according to claim 2, wherein the method further comprises:

determining the threshold range according to a size of a signal coverage area of the source cell.

4. The method according to claim 2, wherein determining to perform cell reselection in response to determining that the distance between the terminal and the reference position of the source cell is outside the threshold range, comprises:

determining to perform cell reselection in response to determining that a first distance between the terminal and the reference position of the source cell at a first moment is outside the threshold range and the first distance is greater than a second distance;

wherein, the second distance is the distance between the terminal and the reference position of the source cell at a second moment; and the second moment is earlier than the first moment.

5. The method according to claim 1, wherein the method further comprises:

receiving ephemeris information sent by a base station; and determining the position of the reference position of the source cell according to the ephemeris information.

6. The method according to claim 5, wherein the reference position is a position determined according to a center position of the source cell; and wherein the center position of the source cell is determined according to the ephemeris information.

7. The method according to claim 1, wherein the method further comprises:

receiving cell configuration information of a target cell for cell reselection.

8. The method according to claim 7, wherein the cell configuration information comprises one or more of following information:

frequency point information of the target cell;

cell identity information;

Synchronization Signal/Physical Broadcast Channel ("SS/PBCH") Block Measurement Timing Configuration ("SMTC") information; or subcarrier spacing information.

9. A terminal, comprising:

at least one processor; wherein, the at least one processor is configured to: determine whether to perform cell reselection based on a positional relationship between the terminal and a source cell; wherein, the cell is a cell covered by a satellite signal, wherein the at least one processor is further configured to:

determine whether to perform cell reselection based on a positional relationship between the terminal and a reference position of the source cell;

wherein a position of the reference position relative to the source cell remains unchanged.

10. A terminal, comprising:

an antenna;

a memory; and at least one processor, respectively connected to the antenna and the memory, and is configured to control the transceiving of the antenna by executing computer executable instructions stored in the memory, the computer executable instructions configured to implement acts comprising:

determining, based on a positional relationship between the terminal and a source cell, whether to perform cell reselection;

wherein, the source cell is a cell covered by a satellite signal, wherein the at least one processor is further configured to:

determine whether to perform cell reselection based on a positional relationship between the terminal and a reference position of the source cell;

wherein a position of the reference position relative to the source cell remains unchanged.

11. A non-transitory computer storage medium storing computer executable instructions, wherein the computer executable instructions are configured to implement the method according to claim 1 after being executed by at least one processor.

12. The terminal according to claim 9, wherein the at least one processor is further configured to:

determine to perform cell reselection in response to determining that a distance between the terminal and the reference position of the source cell is outside a threshold range;

or, determine not to perform cell reselection in response to determining that the distance between the terminal and the reference position of the source cell is within the threshold range.

13. The terminal according to claim 12, wherein the at least one processor is further configured to:

determine the threshold range according to a size of a signal coverage area of the source cell.

14. The terminal according to claim 12, wherein the at least one processor is further configured to:

determine to perform cell reselection in response to determining that a first distance between the terminal and the reference position of the source cell at a first moment are outside the threshold range and the first distance being greater than a second distance;

wherein, the second distance is the distance between the terminal and the reference position of the source cell at a second moment; and the second moment is earlier than the first moment.

15. The terminal according to claim 9, further comprising:

a transceiver configured to receive ephemeris information sent by a base station, wherein the at least one processor is further configured to:

determine the position of the reference position of the source cell according to the ephemeris information.

16. The terminal according to claim 15, wherein the reference position is a position determined according to a center position of the source cell; and wherein the center position of the source cell is determined according to the ephemeris information.

17. The terminal according to claim 9, further comprising:

a transceiver configured to receive cell configuration information of a target cell for cell reselection.

18. The terminal according to claim 17, wherein the cell configuration information comprises one or more of following information:

frequency point information of the target cell;

cell identity information;

SS/PBCH block measurement timing configuration SMTC information; or subcarrier spacing information.

* * * * *